March 24, 1959  W. E. COOPER ET AL  2,878,949
APPARATUS FOR HANDLING FINELY DIVIDED SOLIDS IN LIQUID
Filed Dec. 26, 1956
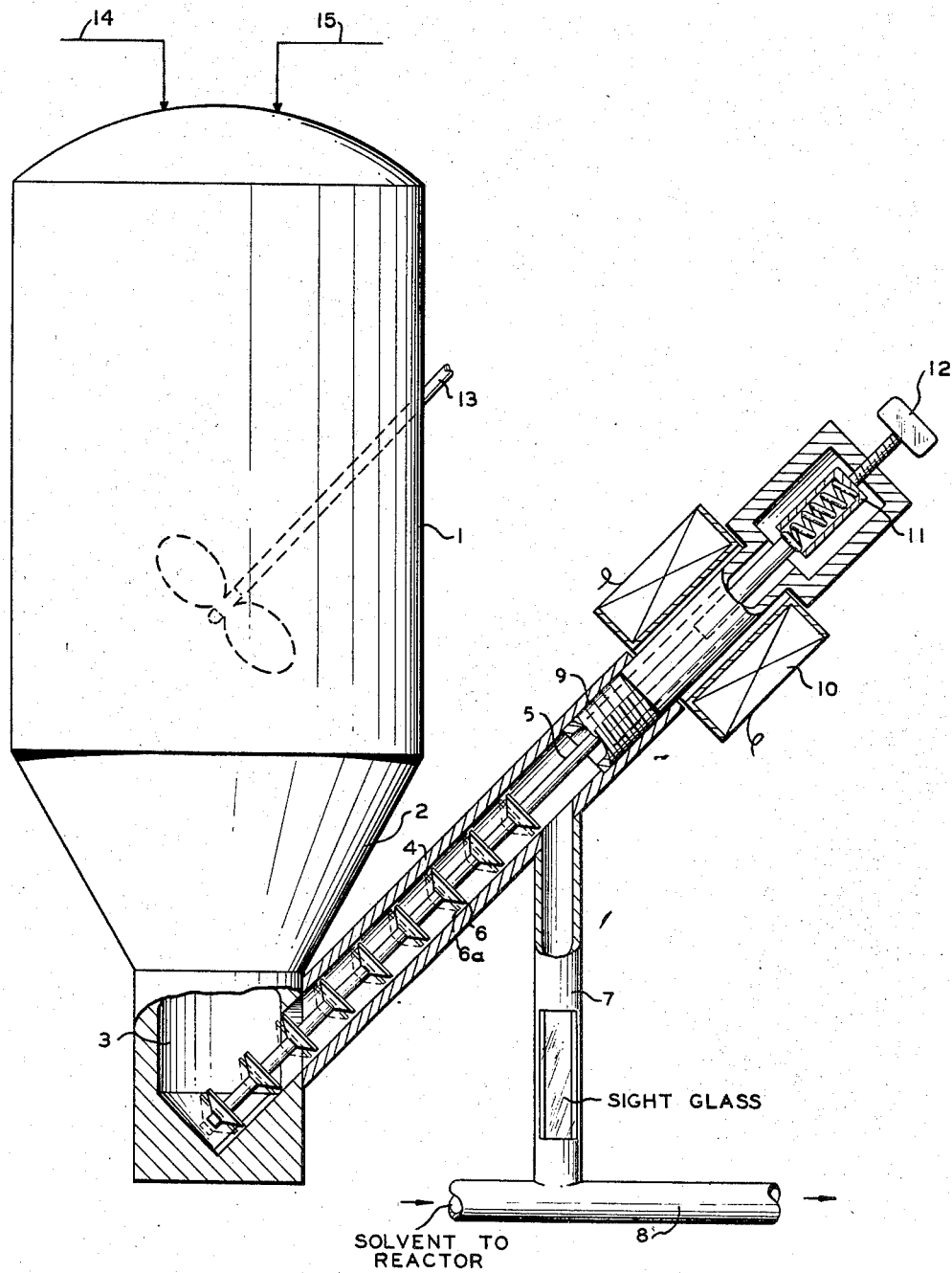
INVENTORS
W. R. EDDY
W. E. COOPER
BY Hudson & Young
ATTORNEYS

United States Patent Office 2,878,949
Patented Mar. 24, 1959

2,878,949

APPARATUS FOR HANDLING FINELY DIVIDED SOLIDS IN LIQUID

Wayne E. Cooper and William R. Eddy, Bartlesville, Okla., assignors to Phillips Petroleum Company, a corporation of Delaware Application December 26, 1956, Serial No. 630,515

5 Claims. (Cl. 214—17)

This invention relates to a novel feed mechanism. In one aspect, this invention relates to a feeder or feed mechanism for finely divided solids in a liquid slurry. In one specific aspect, this invention relates to a feed mechanism for feeding catalyst in a liquid slurry to a reactor stream.

There are many industrial applications wherein finely divided solids are handled in liquid slurries. Frequently, it is desired to handle such slurries in controlled amounts or at controlled rates or very small amounts are required, e.g. a few grams per minute. Such slurries are frequently extremely abrasive and conventional pumping means, control means, etc., are unsatisfactory. We have now devised a novel means for handling such slurries. In particular, our apparatus is ideally suited for handling such slurries at controlled rates, however, the apparatus can also be used for general transfer means.

An object of this invention is to provide an apparatus for transferring solids in liquid slurry.

Another object of this invention is to provide an apparatus for supplying a solids in liquid slurry at controlled rates.

Still another object of this invention is to provide an improved means of supplying a catalyst slurry to a reactor.

Other objects, advantages, and features of this invention will be obvious to those skilled in the art having been given this disclosure.

The apparatus of this invention comprises in combination an elongated shell containing a movable shaft having a plurality of vanes securely attached thereto and means for imparting a vibratory motion to said shaft.

As has been indicated, the apparatus of this invention can be used for handling solids in liquid slurries broadly. Examples of such solids in liquids which can be handled by the apparatus of this invention include catalyst in hydrocarbon, sand in water, fermentation mash in water, carbon black in water and the like. We have found this apparatus particularly useful in feeding a controlled rate of chromium oxide catalyst on a silica-alumina support in a hydrocarbon solvent to an ethylene polymerization reactor. In particular, we have found that our apparatus is useful for feeding a controlled rate of such a slurry at extremely low rates.

In the copending application of Hogan and Banks, filed March 26, 1956, and having Serial No. 573,877, now Patent No. 2,825,721, a novel process is described for preparing novel polymers of 1-olefins in the presence of a chromium oxide catalyst. According to one embodiment of that disclosure, 1-olefins having a maximum of 8 carbon atoms per molecule and no branching nearer the double bond than the 4-position are polymerized at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high temperature (450–1500° F., preferably 900–1000° F.) treatment under non-reducing conditions and preferably with an oxidizing gas. The catalyst size can be in the range of 200–40 mesh, and can be microspherical. Olefins, other than 1-olefins as described, are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or cyclo-paraffin which is liquid under the polymerization conditions; however, vapor phase operation or mixed phase operation can be effected. In carrying out such polymerizations, monomers, solvent and catalyst are fed to the polymerization zone at the desired rate and polymer is removed therefrom. One convenient method of adding the catalyst is in solvent slurry. This invention is particularly suited for feeding such a slurry.

The apparatus of this invention is also suited for feeding sodium slurry to a mass polymerization reactor wherein diolefins are being polymerized or feeding carbon black in water to a latex emulsion in the carbon black masterbatch process. Other uses have been previously indicated. These methods are well known to the art and require no description here, our invention being in the apparatus.

This invention will be further described in conjunction with the drawing which is a representation, partially in section, of the apparatus of my invention in a preferred embodiment.

The drawing shows the apparatus of this invention in conjunction with a storage vessel and solvent conduit for example as could be used in feeding chromium oxide catalyst and solvent to a 1-olefin reaction vessel.

Referring now to the drawing, a hopper 1 having a cone shaped lower section 2 is provided with a feed pit 3. This hopper also has a means for agitation such as stirrer 13. Conduit 14 is provided for adding solid catalyst to the vessel 1 and conduit 15 is provided for adding liquid to said vessel. Operably installed in this pit 3 is the feed apparatus of this invention comprising a cylindrical shell 4, a centrally located shaft 5 and cone shaped vanes 6. 6a shows the location of 6 as it moves due to the vibration of shaft 5. At an upper level in shell 4 a conduit 7 is provided for removing feed. As shown this conduit 7 is also connected to conduit 8 so as to pass the feed to a solvent stream in said conduit 8. Above the level of the outlet conduit 7 is a packing gland 9. The means for imparting vibratory motion in the instant embodiment is a solenoid mounted around shell 4 and is operably connected to cause shaft 5 to vibrate. At the upper end of shaft 5 is a spring 11 which is provided to supply tension. The amount of tension can be regulated by screw 12. The vane spacing on the shaft will depend upon the type and size of feed and size of feeder. The vanes must have sufficient clearance to allow the solids to pass around them from one zone to the next. For a given feeder, the rate of feed will be dependent upon the number of vibrations per unit time. In the embodiment shown, the rate of feed can be varied over a wide range by varying frequency or amplitude of the vibration. Other variables which will effect feed rate, as will be obvious to those skilled in the art, include shape of cones, cone slope, shell slope, length of shell, etc.

In feeding solids in liquid slurries by the apparatus of this invention, the solids apparently remain completely fluidized and flow by boiling up around the vanes and are carried upward until they drop into the outlet conduit. The stirrer 13 should provide only gentle agitation since it is desirable that the solids settle uniformly into zone 3 wherein they can be picked up by the cones. In many installations, stirrer 13 is not required. The slurry in zone 3 should be relatively concentrated with the only agitation in this zone being provided by the vibration of the cones. That is, any agitation effect from stirrer 13 should be negligible in this zone for best results. As has been indicated, this conveyor can be used for controlling the rate of feed of a slurry by regulating the frequency or amplitude of the vibration. For example, in feeding a chromium oxide catalyst, the catalyst is prepared as a slurry of predetermined concentration in hopper 1. The flow rate can then be controlled by setting the solenoid 10 at a predetermined setting. Reproducibility of feed rates is excellent, being well within the allowable variation of catalyst feed.

Those skilled in the art will see many modifications which can be made in the apparatus of this invention and still obtain the advantages thereof, for example other means for imparting vibratory motion can be employed such as an eccentric rotating shaft at one end of shaft 5, etc. Also the system can be balanced to eliminate pressure surges in the line such as by a conduit communicating from the upper liquid level in container 1 to the downstream of conduit 8.

We claim:

1. As a new machine an elongated shell, said shell being mounted at an angle less than 90° from the horizontal; a centrally disposed movable shaft in said shell; means for supplying tension to the upper end of said shaft, a plurality of baffles secured to said shaft disposed in spaced relation along said shaft; said baffles having a predetermined clearance from said shell; means for imparting a vibratory motion to said shaft in the direction of the elongated axis of said shell; means for introducing a solids in liquid slurry to the lower level in said shell and means for removing said slurry from an upper level in said shell.

2. An apparatus comprising in combination an inclined elongated cylindrical shell; a movable shaft located along the elongated axis of said shell; a plurality of frusto-conical vanes in spaced relation along said shaft and secured thereto at the small end thereof; a predetermined clearance between the large circumference of said vanes and said shell; means for supplying tension to one end of said shaft; means for imparting a vibratory motion to said shaft along its elongated axis; means for introducing solids in liquid slurry to a low level of said shell and means for removing solids in liquid slurry from an upper level of said shell.

3. The apparatus of claim 2 wherein said tension means comprises a spring at the upper end of said shaft and means for regulating the amount of compression of said spring.

4. The apparatus of claim 3 wherein the said means for imparting a vibratory motion is a solenoid.

5. An apparatus for supplying catalyst to a reaction system comprising in combination a slurry vessel; means for introducing catalyst solids to said vessel; means for introducing a liquid carrier to said vessel; means for slurrying said catalyst in said liquid; a cylindrical elongated shell in communication with said vessel at a low level therein and extending in an upward direction therefrom; a movable shaft located along the elongated axis of said shell; a plurality of frusto-conical vanes in spaced relation along said shaft and secured thereto at the small end of said vanes; a predetermined clearance between the large circumferences of said vanes and said shell; means for supplying tension to one end of said shaft; means for imparting a vibratory motion to said shaft along its elongated axis; means for introducing said slurry to said shell where same communicates with said vessel; and means for passing said slurry from an upper level of said shell to a reactor.

References Cited in the file of this patent
UNITED STATES PATENTS

| 2,247,726 | Gingher | July 1, 1941 |
| 2,537,811 | Boeckeler | Jan. 9, 1951 |
| 2,578,673 | Cushman | Dec. 18, 1951 |